May 6, 1969 W. J. ROANTREE 3,442,160

MULTIPLE DRILL HEAD

Filed April 18, 1967

INVENTOR
WILLIAM J. ROANTREE
BY Albert M. Parker
ATTORNEY

United States Patent Office 3,442,160
Patented May 6, 1969

3,442,160
MULTIPLE DRILL HEAD
William J. Roantree, Port Washington, N.Y., assignor to Roantree Electro-Mech Corporation, Port Washington, N.Y., a corporation of New York
Filed Apr. 18, 1967, Ser. No. 631,780
Int. Cl. B23b *39/16, 47/06;* B27c *3/04*
U.S. Cl. 77—22                                    15 Claims

ABSTRACT OF THE DISCLOSURE

A drill head for drilling a plurality of holes. A plurality of elements including drills having circular cylindrical shanks, dummies (circular cylindrical bodies selectively replacing the drill shanks), circular cylindrical idlers, and a driven member or members having portions similar to the idlers are arranged in a cluster with the drills located at the desired positions. The drill shanks, dummies, idlers, and driven members (herein called "driven idlers") are so arranged that the peripheral surfaces of every pair of engaging elements travel in the same direction. Driving torque is imparted to each of the drills by one or more driven idlers through the rolling contacts between the serially engaged elements. The described manner of driving the drills permits the drilling of a plurality of holes with very close center spacings.

BACKGROUND OF THE INVENTION

Field of the invention

The invention relates to a drill head for simultaneously drilling a plurality of holes, which may be spaced at very close center distances. The invention also permits the simultaneous driving of a plurality of closely spaced shafts from a single power source.

Description of the prior art

Prior art multiple drill heads have employed a plurality of serially meshing gears, each such gear driving a stub shaft to which a drill is connected by a suitable chuck. The gears must have at least a predetermined minimum diameter and number of teeth in order to carry the required torque load and to operate smoothly. The drill mounting chucks must also have a predetermined minimum radial dimension in order to possess the required strength. These two factors limit the center distances of holes which may be drilled by prior multiple drill heads.

Summary of the invention

The invention provides a device for efficiently rotatably driving a plurality of closely spaced shafts from a single rotating source of power. In the embodiments shown, the driven shafts are drills which are located in a predetermined grid pattern, the drill head including a driving shaft, the shanks of the drills or dummies replacing desired ones of the drills, idlers, and supporting rolls bordering the matrix formed by the driving shaft, drill shanks, dummies, and idlers. All of the above elements of the drill head have accurately sized diameters, and are maintained forcibly thrust together so as to hold the center spacings between the various elements of the matrix very accurately, and also to maintain secure rolling driving contact between the various elements in the drive trains from the driving shaft or driven idler to each drill.

To produce such results, the rotatable elements forming the matrix or drill shank positioning, retaining, and driving section of the drill head are so arranged that the peripheral surfaces of all engaging elements travel in the same direction and at the same speed. Put in another way, the arrangement is such that no three rolling elements of the matrix are in mutual contact with each other. The matrix also includes means whereby the matrix bordering, support rollers squeeze the entire matrix in such manner that all rolling elements of the matrix have four compressive forces acting upon them, all of such compressive forces being directed normal to the surface of each rolling element.

The illustrative multiple drill head of the invention includes means whereby drills may be readily removed from or added to the matrix at each drill-receiving position thereof. Thus such drill head includes a dummy storage section having means therein for storing a dummy, which is identical with the shank of the drill, axially aligned with each drill receiving position. When a drill is removed from the matrix, the dummy located above it in the dummy storage section replaces it, whereby to retain the stability of the matrix and the drive between the parts thereof.

Figures 8, 9, 10, 11:
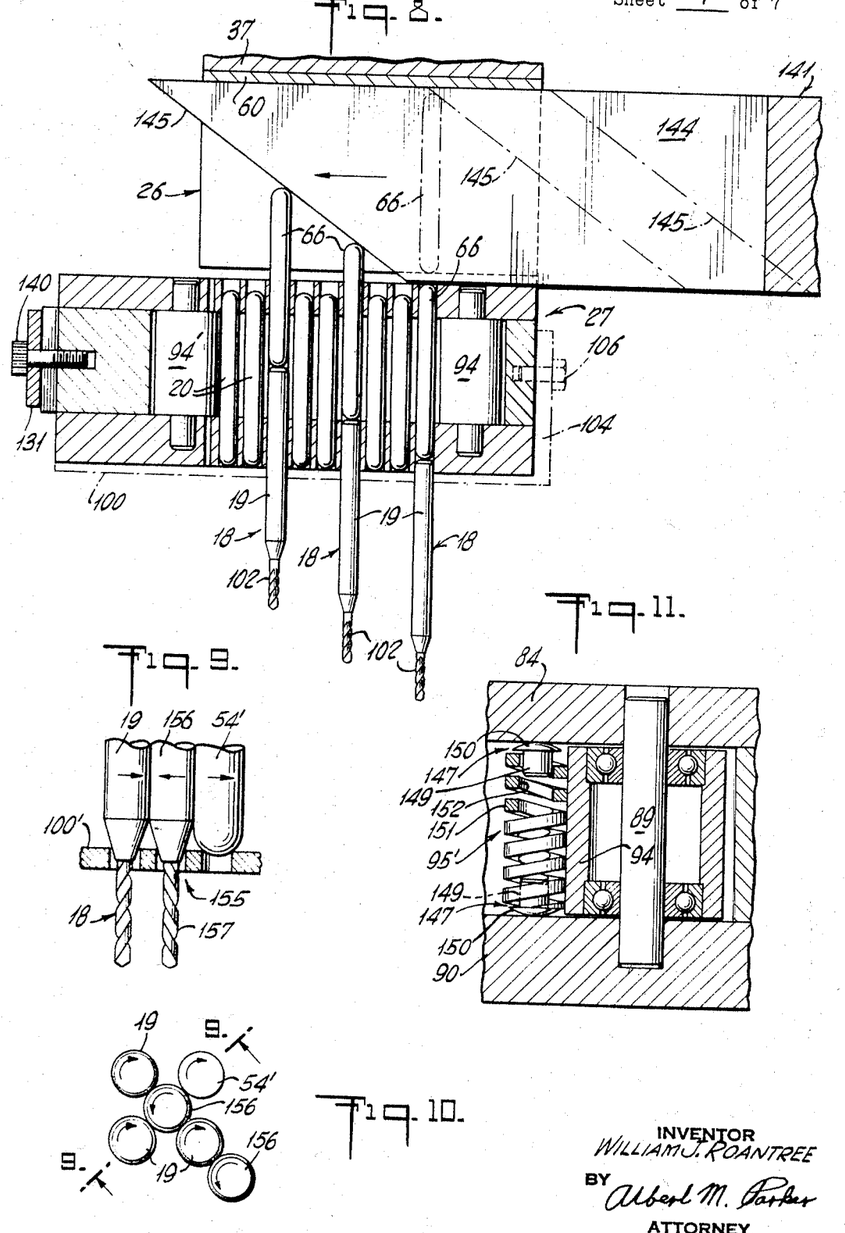
FIG. 8 is a view in transverse vertical section through the intermediate, dummy storage section and the lower, matrix section of a drill head in accordance with the invention, dummies in the intermediate section being shown in the act of being thrust downwardly by the drill removing tool.
FIG. 9 is a fragmentary view in vertical transverse section of a drill head in accordance with the invention provided with both right- and left-hand drills.
FIG. 10 is a view in plan of a portion of the matrix of the drill head provided with right- and left-hand drills as in FIG. 9.
FIG. 11 is a fragmentary view in vertical transverse section through a border of the lower, matrix section of a drill head in accordance with the invention, such matrix being provided with a modified, resilient intermediate support roller.

Although for simplicity usually all of the drills employed with the drill head of the invention are of the same hand, in some instances, as for example where extremely close center spacing is desired between holes, desired ones of the idlers may be replaced by drills of a hand opposite from that of the other drills. Such arrangement is shown in FIGS. 9 and 10.

The device of the invention, when employed as a multiple drill head, may be used to advantage in the production of articles wherein a particular pattern of a plurality of holes in the article is repeated in a grid fashion. Thus the multiple drill head may be used for the drilling of headers for heat exchangers, and the drilling of electronic circuit boards. In accordance with the invention, the drills can be located on centers of a grid pattern as close as $\frac{1}{10}''$ x $\frac{1}{10}''$.

Brief description of the drawings

In the drawings, wherein like reference characters refer to like parts throughout the several views.

Description of the preferred embodiments

As is apparent from the above, FIGS. 1–8, inclusive, illustrate a multiple drill head in accordance with the invention which is provided with drills all of the same hand. FIGS. 9 and 10 illustrate a multiple drill head in accordance with the invention provided with drills, some of which are of one hand and the others of which are of the opposite hand. FIG. 11 illustrates a modified, resilient, intermediate support roller for the matrix of the drill head of either FIGS. 1–8, inclusive, or FIGS. 9 and 10.

General organization

Figure 1:
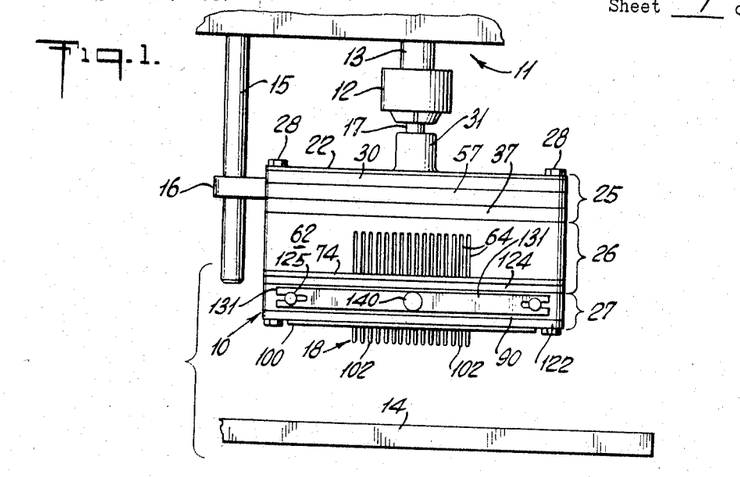
FIG. 1 is a fragmentary view in side elevation of a drilling machine provided with a preferred embodiment of multiple drill head in accordance with the invention.

The first disclosed embodiment of multiple drill head in accordance with the invention, which is shown in FIGS. 1–8, inclusive, is generally designated by the reference character 10. Such drill head is shown in FIG. 1 as being mounted upon a fragmentally depicted drilling machine 11 having a chuck 12 affixed to an axially reciprocable arbor 13 so as to be advanced toward and retracted from a table 14 upon which a workpiece (not shown) is supported. The multiple drill head 10 is provided with a main driven shaft 17 which is mounted in the chuck 12, the drill head 10 thus reciprocating with the chuck 12 and the arbor 13. The drill head 10 is restrained from rotation by a vertical guide post 15 affixed to the body of the drilling machine 11, the guide post being accurately slidingly received within a guide member 16 projecting laterally from the body of the drill head 10.

As above indicated, the drills mounted in the drill head 10 are driven by rolling contact between their circular cylindrical shanks and other similarly shaped bodies which may be idlers, driven idlers, dummies having the same diameter as the drill shanks, or, as in the case of the drill head shown in FIGS. 9 and 10, the shanks of other drills of opposite hand which replace some or all of the idlers. In the embodiment of FIGS. 1–8, inclusive, all of the drills 18 are of the same (right) hand, the shanks 19 of such drills engaging idlers 21, driven idlers 54, and/or dummies 20 (FIGS. 4 and 6) depending upon their location in the drill matrix.

All of such latter members, that is, the drill shanks and the other circular cylindrical members directly or indirectly driving the drill shanks, are contained in a section 27 which is herein called the matrix section, section 27 being located adjacent the lower end of the drill head 10. Immediately above the section 27, the drill head has a section 26, designated the dummy storage section, wherein dummies, lying above the matrix positions which are then occupied by drill shanks, are stored. Above the dummy storage section 26 the drill head has a gear drive section 25, such section being covered by an upper plate 22 which is shown in FIG. 1 but is omitted in FIGS. 2, 3a, 3b, and 3c for clarity of illustration. As shown, each of sections 25, 26, and 27 is composed of a plurality of superimposed plate-like members. All of such members and main parts thereof are provided with a plurality of laterally extending ears, a plurality of vertical draw bolts 28 extending through such ears and holding the sections of the drill head together in superimposed relationship.

Figure 4:
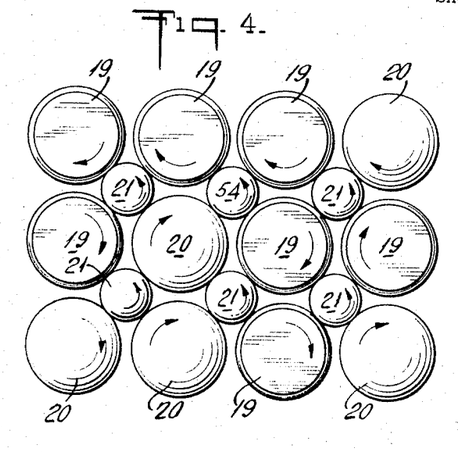
FIG. 4 is a view in plan of the portion of the matrix of the lower section of the drill head, such matrix being made up of drill shanks, dummy drill shanks or "dummies," idler rollers, and driving rollers or "driven idlers"
Figure 6:
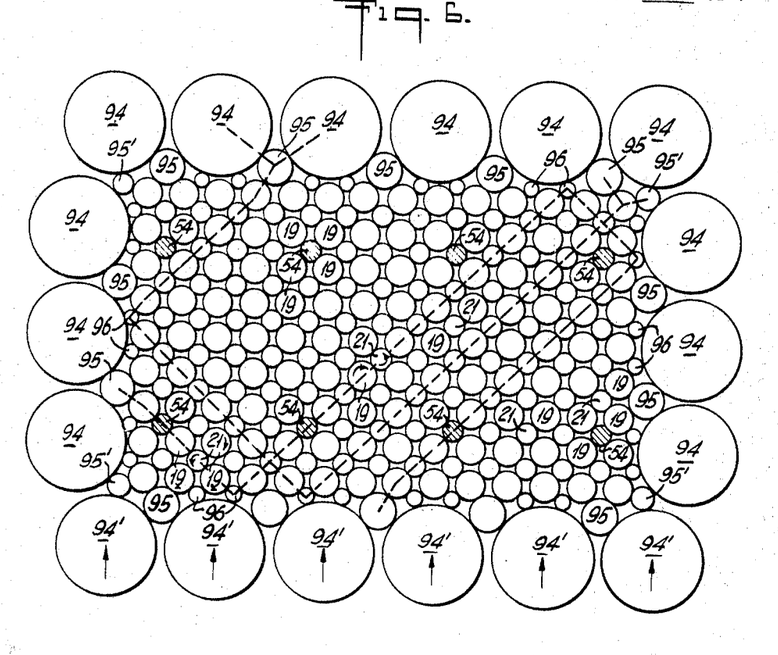
FIG. 6 is a view in plan of a matrix contained in the lower section of a drill head in accordance with the invention, the figure showing paths of force transmission between representative members of the matrix.

The matrix section 27 of the drill head is provided with an adjustable side supporting means 29 whereby the matrix composed of the drill shanks, idlers, and so forth shown in FIGS. 4 and 6 are maintained under constant compression so as to maintain frictional driving engagement between the various members.

The gearing section 25

Figure 3A:
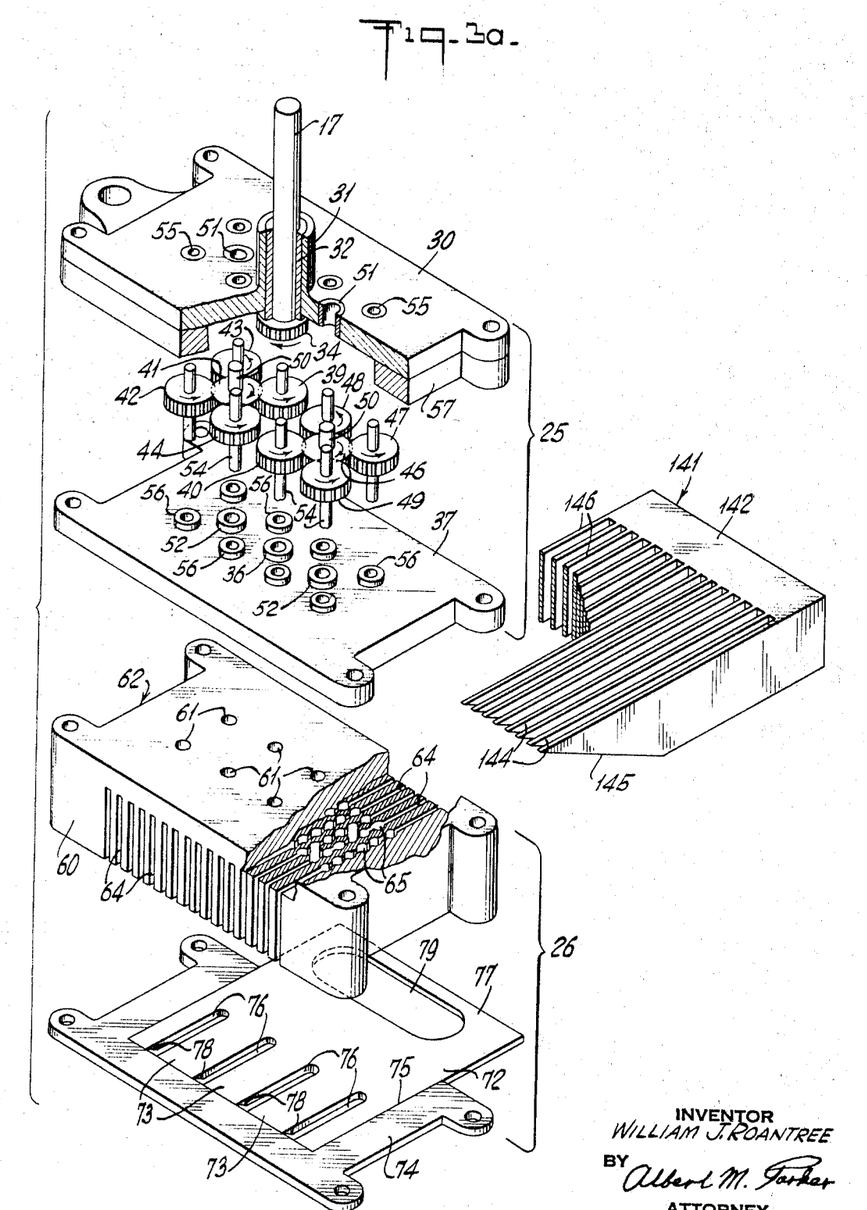
FIG. 3a is a fragmentary exploded view in perspective of the upper, gear section, and intermediate, dummy storage, section of the illustrative drill head and of the tool or comb employed in the removal of drills from the drill head, parts of the upper section of the drill head being broken away.
Figure 5:
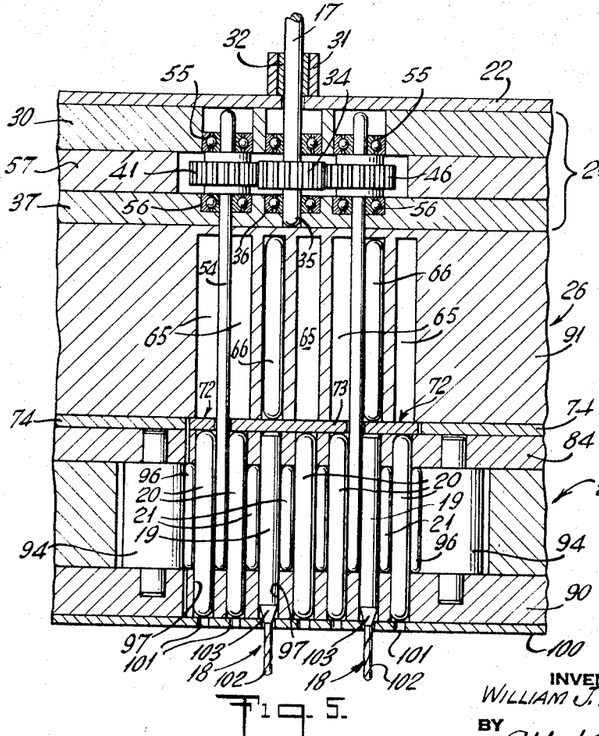
FIG. 5 is a fragmentary view in vertical diagonal section through the drill head, the view showing at the right-hand portion of the matrix an arrangement of drill shanks, dummies, and rollers which is essentially that shown in FIG. 4, the drills all being right-hand drills, the section being taken along the line 5—5 of FIG. 2 looking in the direction of the arrows.
Figure 7:
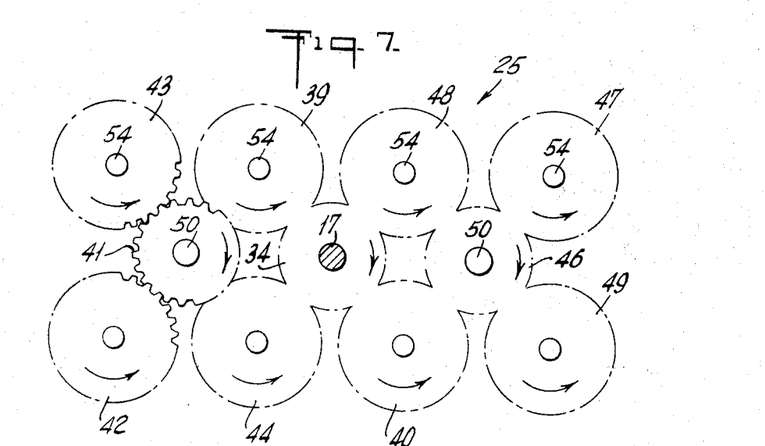
FIG. 7 is a view in plan of the gears shown in the upper section in FIG. 3a, the main drive shaft for the drill head being shown in horizontal section.

The gearing section 25 is shown most clearly in FIGS. 3a, 5, and 7. Such section has a main upper plate 30 having an upstanding hollow boss 31 having a bearing sleeve 32 therewithin which receives the main driving shaft 17 of the drill head. Affixed to the lower end of shaft 17 is a main drive pinion 34, there being a short axially disposed depending stub shaft 35 on shaft 17 below the gear 34. Stub shaft 35 is received within a bearing 36 in the lower main plate 37 of the gearing section 25, as shown in FIG. 5. The upper and lower plates 30 and 37 are spaced from each other by an interposed spacer plate member 57, the central portion of which is cut out to form a space receiving the gear train, now to be described, of the gear driving section. Pinion 34 serves as the source of power for the drive train of the gearing section to the various driven idlers 54 which are distributed over the area of the drill matrix, the drive proceeding ultimately through members in the drill matrix having rolling frictional contact to the shanks of the drills mounted in the matrix. As shown in FIGS. 3a and 7, pinion 34 is in mesh with four pinions 39, 48, 44, and 40, pinions 39 and 48 lying in a first outer row of gears and pinions 44 and 40 lying in a second outer row of gears. Pinions 39 and 44 in turn mesh with a pinion 41 in the central row of gears; pinion 41 in turn meshes with and drives pinions 42 and 43 in the respective outer rows of gears. Gears are provided at the right-hand end of the gear train, as shown in FIG. 7, in a manner similarly to those above described at the left-hand end theerof. Thus the pinions 40 and 48 mesh with and drive a pinion 46 in the central row of pinions, pinion 46 in turn meshing with and driving further pinions 47 and 49 in the two respective side rows of pinions.

Each of the pinions in the outer side rows thereof rotates in the same direction (shown as counterclockwise in FIG. 7); each such pinion is connected to and drives a driven idler 54, which is in the form of an elongated depending circular cylindrical shaft which extends downwardly into the matrix section 27. The portions of shafts 54 immediately above and below their respective pinions are mounted in suitable bearings 55 and 56, respectively, in the upper and lower plates 30 and 37 of the gearing section 25. The pinions 41 and 46 in the central row of pinions are provided with stub shafts 50 which are received in bearings 51 and 52 in the respective upper and lower plates 30 and 37.

The dummy storage section 26

The dummy storage section 26 is in this embodiment formed of members 60 and 74. Member 60 is in the form of a single block of metal, the upper portion 62 of which is unslotted as shown in FIG. 3a. Below portion 62 the block 60 is provided with a plurality of downwardly open relatively deep slots 64 which extend from the front to the back of the block as it is shown in FIG 1. At appropriate locations the block including the unslotted upper portion 62 thereof is provided with bores 61 freely receiving the power driven shafts 54. Intermediate their horizontal lengths the slots 64 are provided with spaced vertical passages 65 disposed centrally of the respective slots. Passages 65, which are generally circular in horizontal section, serve as storage spaces for dummies, which in their upper, stored position are designated 66. It will be apparent that with one such passage 65 provided above each of the drill shank positions of the drill head matrix, the drill head has its maximum flexibility as to the number of hole patterns which may be drilled by it.

As shown at the bottom of FIG. 3a, the dummy storage section 26 is completed by a lower plate 72, 74 which underlies the body 60 and functions both to retain the dummies 66 in the dummy storage section and as a thrust plate for the upper ends of the shanks 19 of the drills 18 mounted in the matrix section 27. It is necessary to withdraw the plate 72 from the drill head assembly during both the replacement of one or more drills in the drill matrix by a dummy and the restoring of a dummy to the storage space provided therefor in the member 26. Thus there is employed a generally U-shaped spacer member 74 having the general outline of the other main members in the drill head, member 74 being retained in the assembly by the draw bolts 28. Member 74 is provided with a central cut out portion of large area, the space 75 thus provided within the member 74 receiving the forward or inner end of the thrust plate 72. The spacer member 74 is preferably made slightly thicker than the member 72 so that the member 72 may be freely slid into and withdrawn from the space 75. The forward end of member 72 is provided with laterally spaced parallel slots 76 extending from the forward end thereof, the slots 76 freely receiving the vertical driven shafts 54. The remaining forward portions 73 of member 72, between the slots 76, are provided with bevelled lower edges 78 whereby upon the insertion of the member 72 into the operative position thereof in spacer 74 shown in FIG. 3a, the upper ends of the drill shanks are thrust downwardly by the bevelled edges 78 into their operative positions shown in FIG. 5. To provide for the ready manipulation of the member 72, the body thereof is extended rearwardly as shown at 77 and is provided with a handle forming slot 79 (FIG. 3a).

The matrix section 27

Figure 3B:
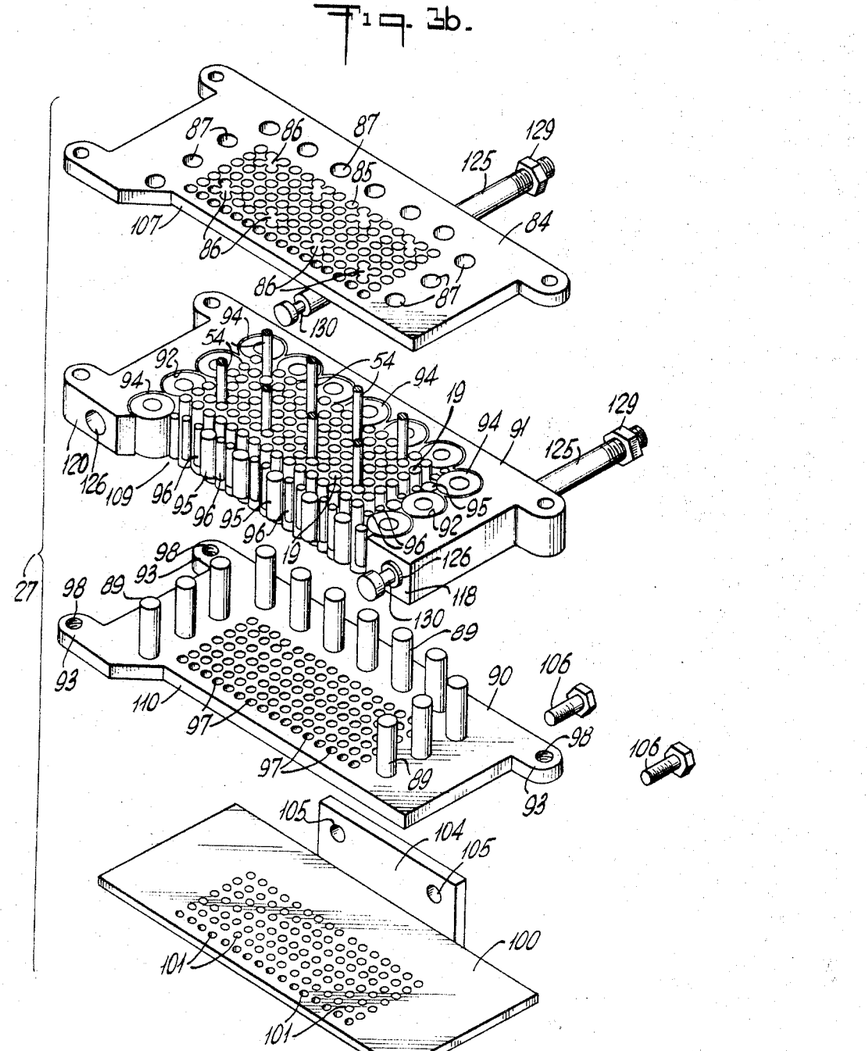
FIG. 3b is an exploded view in perspective of the lower, drill shank retaining, section of the drill head, the adjustable matrix compressing unit being omitted.

The matrix containing section 27 of the drill head is particularly shown in FIGS. 3b and 5. As there shown, such section includes an upper plate member 84 which lies immediately beneath the plate member 72, 74 in the drill head assembly. Member 84 is provided with a plurality of holes 85 over its central area, such holes receiving the upper ends of the drill shanks 19 and the upper ends of the dummies 20. At appropriate locations, four contiguous holes 85 are connected by cross slots 86 whereby to provide passages through the plate 84 which freely receive the vertically extending power driven shafts 54. The plate member 84 is also provided with a plurality of larger spaced holes 87 which border the holes 85, holes 87 receiving the upper ends of stub shafts 89 which are fixedly connected to a lower plate member 90 of the matrix section 27.

Between the plates 84 and 90 there is mounted an intermediate spacer plate member 91 which is retained in the assembly by the vertical draw bolts 28 which extend through two ears on the left-hand end of member 91 as it is shown in FIG. 3b and through one ear on the right-hand rear corner thereof. The member 91 has vertically extending generally semi-circular cylindrical cut out portions 92 spaced along the inner edges thereof, such cut out portions freely receiving fixed larger diametered support rollers 94 which are mounted upon the stub shafts 89. Successive rollers 94 have their confronting surfaces close to each other, but such surfaces do not touch. Each two successive rollers 94 are provided with a bridging intermediate support roller 95 of somewhat smaller diameter than the rollers 94, rollers 95 being retained between the confronting surfaces of plate members 84 and 90. The matrix is further provided with a plurality of still smaller diametered intermediate support idlers 96 which are spaced about each respective roller 94 between successive intermediate support rollers 95. The disposition of the fixed support rollers 94, the intermediate support rollers 95, and the intermediate support idlers 96 in the matrix will perhaps be better understood upon consideration of the plan view of the matrix in FIG. 6. Member 90 is provided with a plurality of holes 97 which are the same as and located similarly to the holes 85 in the plate member 84. Holes 97 receive the lower ends of the drill shanks 19 and the lower ends of the dummies 20, as shown most clearly in FIG. 5.

In order to retain the dummies 20 and the drill shanks 19 against escape from the holes 97 in member 90, there is provided a lower dummy retaining plate 100 which closely underlies the plate 90 when the drill head is assembled for use. Plate 100 has a plurality of holes 101 therethrough, such holes being coaxial with the holes 97 in plate member 90 but of somewhat smaller diameter than such holes so that the rounded lower ends of the dummies 20 rest upon plate 100 at the upper rims of the holes 101 and the reduced diametered fluted cutting portion 102 of each of the drills 18 projects centrally downwardly through its respective hole 101. As shown, drills 18 are provided with a downwardly converging frustoconical zone 103 between the upper end of their cutting portions 102 and their shanks 19. The drills are supported by the plate 100 through engagement between zones 103 of the drills and the upper edges of the holes 101 receiving the drills.

The dummy retaining plate 100 is secured to the drill head by an upstanding flange 104 on the rear edge of such plate. Flange 104, in turn, is removably secured to the plate 91 by a plurality of machine screws (two shown) 106 which pass through holes 105 in flange 104 and are screwed into the rear edge portion of plate 91. When it is desired to remove various ones of the drills from the drill head and to replace them with others, it is necessary to remove the plate 100 from the plate 91 so as fully to open the lower ends of the drill and dummy receiving holes 97 in plate 90. After the matrix has been re-assembled with the desired drills substituted therein, the plate 100 is replaced on the drill head.

The matrix compressing means

Figure 2:
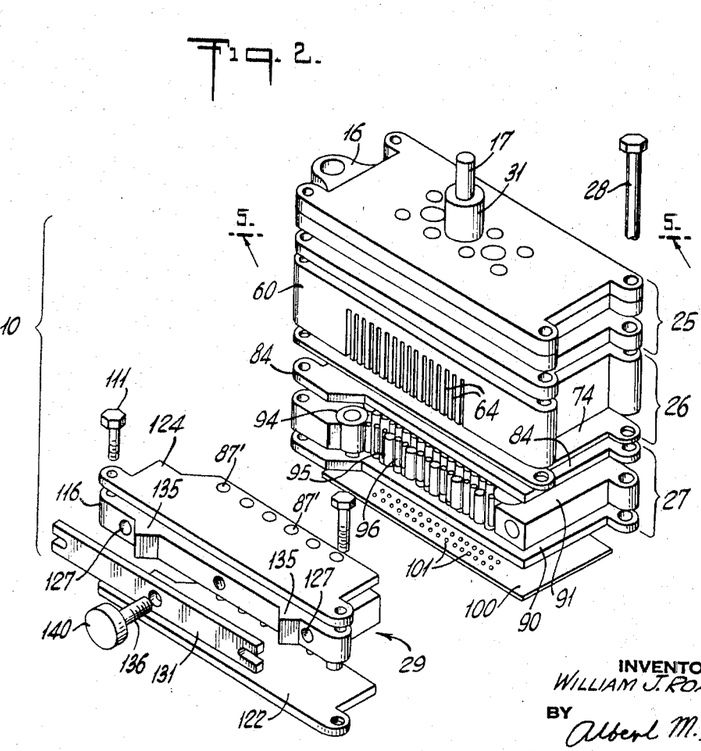
FIG. 2 is a fragmentary exploded view in perspective of the drill head shown in FIG. 1, certain of the parts of the drill head being omitted for clarity of illustration.

As shown in FIGS. 2 and 3b, the forward edge of the main part matrix section 27 is partially cut away so as to provide for the reception of the matrix compressing means 29. Thus plate 84 has a forward cut out portion 107, the forward edge of plate 91 and the matrix elements received therein are in effect cut away at 109 and the forward edge of the plate 90 is cut away at 110. The structure of the matrix compressing means 29 will be more readily understood by consideration of FIG. 3c.

Figure 3C:
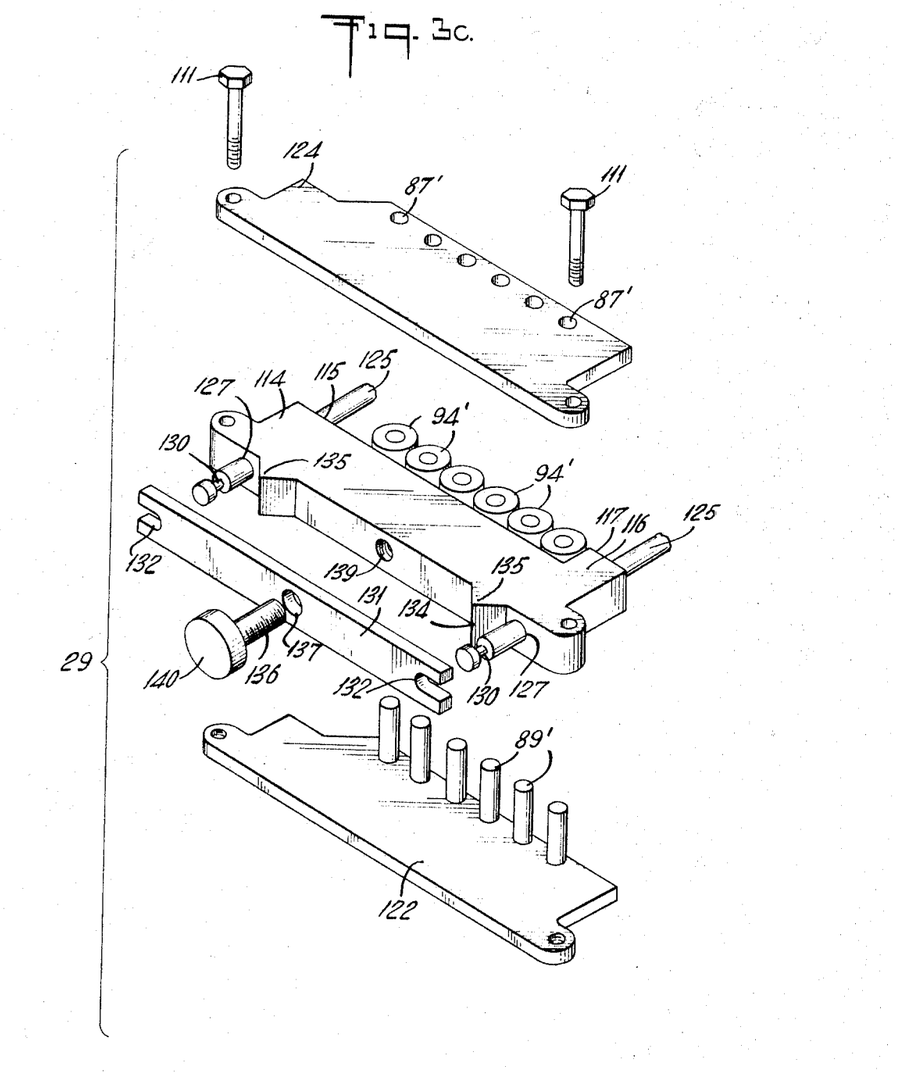
FIG. 3c is an exploded view in perspective of the adjustable matrix compressing unit which is associated with the lower section of the drill head.

Means 29 has an upper plate 124, an intermediate thicker plate 114, and a lower plate 122 which is similar in shape to plate 124, such plates being held together in stacked relationship by screws 111. The rear edges of such plate members are, in effect, complementary to the cut out portions of the plates 84, 91, and 90 so that when the assembled means 29 is added to the main portion of the drill head there results a structure which is generally rectangular in horizontal section. The lower plate member 122 carries a plurality of upstanding stub shafts 89' spaced along its rear edge, such stub shafts mounting fixed supporting rollers 94' which are shown in FIG. 3c as associated with the plate 114; the upper ends of the stub shafts 89' above the rollers 94' are received within the holes 87' which are spaced along the rear edge of the upper plate 124. The engagement between the upper ends of the stub shafts 89' and the holes 87' in the upper plate hold the upper and lower plates of the unit 29 from horizontal movement relative to each other.

The unit 29 is held on the main body of the drill head 10 between the spacer member 72, 74 on the top and the dummy and drill retaining plate 100 on the bottom. Thus the unit 29 is located accurately vertically with respect to the main body of the drill head. The intermediate main plate 114 of unit 29 is held upon the main portion of the drill head by means of two elongated bolts 125 which extend through parallel horizontal bores 127 in member 114. The forward end of each of bolts 125 is annularly grooved as shown at 130 whereby to be secured to the ends of a spring bar 131 in a manner to be explained. The rear ends of the bolts 125 are threaded and receive nuts 129 which are tightened after the ends of the bar 131 have been secured to the forward ends of the bolts 125. Such tightening of the bolts 125 brings the rear end 117 of a rearwardly projecting end leg 116 on member 114 close to the confronting forward surface 118 (FIG. 3b) of the right-hand end of plate 91. The surface 115 at the rear of the left-hand end of member 114 then lies close to the surface 120 at the left-hand forward corner of the plate member 91. As a result, the member 114 is fixed vertically and laterally in the horizontal direction in an accurately predetermined relationship with respect to member 91, and completes the frame which surrounds the matrix elements while itself being resiliently urged rearwardly of the drill head to compress the matrix members thereof.

The above-mentioned bar 131 overlies the forward face of the member 114, the intermediate part of the bar spanning the distance between the vertical central edges of two similarly forwardly projecting broad V-shaped formations 135 on member 114. The ends of the bar, bearing the elongated slots 132, then lie laterally outwardly of the formations 135 in positions to receive the slotted forward ends of the bolts 125. In assembling the unit 29, the rollers 94' are first placed on the stub shafts 89', the plate 114 is then mounted on the plate 122, and the upper plate 124 is then disposed on top of the rollers 94' to receive the stub shafts 89' within the holes 87'. The elongated bolts 125, with the nuts 129 removed therefrom, are then mounted with their grooved forward ends received within the slots 132 of bar 131. The bar 131 is then retained upon the member 114 by passing a machine screw 136 through a central hole 137 in the bar 131 and screwing it into a central threaded hole 139 in member 114. Thereupon the unit 29 as a whole, including the bolts 125, is mounted upon the main portion of the drill head with the bolts 125 projecting through the holes 127 in the member 114. Nuts 129 are then mounted upon the rear ends of the bolts 125 and tightened in place. Further tightening of the matrix elements into firm driving relationship with respect to each other is effected by tightening the screw 136 through the medium of a thumb knob 140 thereon. Such tightening of the screw 136 flexes the bar 131, imposes an increased tension upon bolts 125, and subjects the unit 29 and the supporting rollers 94' carried thereby to resilient yielding pressure.

In order to transmit torque to each drill shank in the matrix, it is necessary to have a normal force at the location of rolling contact between the drill and its adjacent idler. This normal force is derived from the support rollers which squeeze the entire matrix in such manner that all rollers of the matrix have four normal forces acting upon them. This relationship is shown in the force diagram of FIG. 6. The support rollers 94 along the rear, right, and left-hand sides of the matrix are fixed relative to the main body of the drill head; the support rollers 94' along the forward side of the matrix exert resilient pressure thereon in the manner explained above. With the relationship between the parts as shown, the compressive force exerted on the matrix by unit 29 is transmitted from roller to roller along a 45° path and the entire matrix is uniformly squeezed. It will be seen in FIG. 6 that the intermediate support rollers 96 deflect the forces at right angles. Such are reflected around through the matrix until any particular force path meets one of the intermediate support rollers 95 that does not deflect the forces. This one intermediate support roller, therefore, provides the necessary dimensional stability of the matrix to insure the desired center line distance spacing between the various drills of the matrix.

In the illustrative matrix the matrix is of rectangular shape in plan. The outer support rollers 94 are all of the same diameter, and are spaced at equal distances along the respective sides and ends. The rollers 94, 94' at the corners of the matrix are located on the diagonals of the matrix, and at equal distances from the end rollers 94, 94' in the rows thereof bordering the sides proper of the matrix. Two intermediate support rollers 95 contact each of the rollers 94, 94' which are disposed along the sides and ends of the matrix, rollers 95 being spaced apart around the respective rollers 94, 94' along the sides proper of the matrix and disposed symmetrically with respect to vertical planes through the axes of opposing rollers 94, 94'. These rollers 95 are spaced approximately 90° apart around the rollers 94, 94' which they engage. The rollers 95, 95' engaging each roller 94, 94' at the corners of the matrix are disposed approximately 45° apart about the axes of the rollers 94, 94' which they engage, and are located symmetrically on opposite sides of diagonal vertical planes through the axes of the rollers 94, 94' at the corners of the matrix. As a result of such construction, all of the rotatable members of the matrix are disposed in two rows extending at 45° with respect to the sides of the matrix and at 90° with respect to each other.

*Loading and unloading the drill head*

When it is desired to remove one or more drills from the matrix, to add drills to the matrix, or to change the distribution of the drills in the matrix, the drill head 10 is preferably removed from the drilling machine and is disposed supported on one end so that the drills lie horizontal. The drill and dummy retaining plate 100 is then removed from the drill head. The dummy retaining plate member 72 is then withdrawn. The screw 136 is loosened somewhat so as to lessen the compressive forces upon the members of the matrix. The tool or comb 141 is then employed to thrust the dummies in the dummy section 26 outwardly of their pockets and, through them, to thrust the drills which are then mounted in the matrix out of the drill head.

The construction of the tool or comb 141 employed for this purpose will be apparent in FIGS. 3a and 8. Tool 141 is made with a vertical thickness (FIGS. 3a and 8) which is slightly less than the thickness of the body of member 60 of the dummy storage section. The rear end portion 142 of the tool 141 is unslotted, the forward end portion of the tool being made up of a plurality of fingers or tines 146, separated by vertical slots 144, the fingers or tines 146 having such thickness that they fit fairly accurately within the slots 64 in the member 60. The fingers or tines 146 are deeply bevelled at 145 so that the forward ends of the fingers 146 lie at the top of the fingers.

The tool 141 is inserted into the rear ends of the slots 64 in the dummy storage section 26 of the drill head. As shown in FIG. 8, the leading lower bevelled surfaces of the fingers 146 progressively thrust the dummies 66 in such section outwardly thereof, the dummies being thus thrust in turn engaging the ends of the drill shanks 19 and thereby thrusting the drills out of the matrix. During this operation, the matrix remains stable, because the dummies thus advanced from the dummy storage section take the place of the shanks of the drills which have now been removed from the matrix. The tool 141 is then removed from the drill head. New or substitute drills may now be inserted into any of the drill positions of the drill head, the insertion of the shank 19 of each such drill thrusting the dummy 66 at such position rearwardly into the dummy storage section. After the desired new drill pattern has been created, the drill and dummy retaining plate 100 and plate 72 are again assembled upon the drill head, and the screw 136 is again tightened to subject the matrix to the desired compressive force.

In the embodiment of drill head thus far described, all of the drills have been of the same one hand; specifically, they have been right-handed drills. Obviously if the main drive shaft 17 were driven in the reverse direction the drills there shown would be left-handed drills. In some instances, particularly where very close center distances are desired between bores in the pattern being drilled, a combination of right and left-hand drills may be employed in the same drill head. Thus as shown in FIGS. 9 and 10, it is necessary only to replace desired ones of the idlers by drill shanks. A part of the drill head matrix shown is provided with one driving member 54′ which directly engages and drives the shank 156 of a first left-hand drill 155 with which the shanks 19 of three right-hand drills are directly in contact. In such embodiment the shanks of all the drills and the driving member 54′ are of the same diameter, thus causing all of such members to rotate at the same speed. When it is desired to drill very small diametered holes close to others and where differences in speeds of rotation of the various drills are not objectionable, it is possible merely to replace the idlers 21 in the drill heads shown in FIG. 5 with the shanks of left-handed drills, the idler retaining plate 90 and the dummy and drill shank retaining plate 100 of the embodiment of FIG. 5 being then replaced by similar elements which, however, have passages therethrough for the reception of the fluted operative ends 157 of the left-handed drills 155.

In FIG. 11 there is shown a modified intermediate support roller 95′ of such construction as to be resiliently deformable. Roller 95′ aids in distributing the normal forces between the elements of the matrix in order to maintain a firm driving relationship therebetween. The intermediate support roller 95′ in FIG. 11 is in the shape of a helical spring made of heavy spring wire of rectangular cross section. Roller 95′ is mounted between the lower idler retaining plate 90 and the upper plate 84 of the section 27, the periphery 151 of roller 95′ being in contact with a fixed support roller 94. In order to retain the roller 95′ in place, it is preferably provided with end bearing means 147 in the form of stub shafts 149 at its opposite ends, such stub shafts having a diameter which is substantially less than the inner diameter of the roller 95′ so as loosely to engage the inner surface 152 of the roller. Stub shafts 149 are provided with mushroom shaped heads 150, the outer surfaces of which engage the plates 84 and 90.

The construction of roller 95′ and its supporting means is such that the roller may flex somewhat as required by any surface irregularities in the members of the matrix. In a matrix section provided with such rollers along the two end and the rear edges of the matrix, as well as with a matrix compressing unit 29, compressive forces exerted upon the matrix will be directed inwardly from all four borders thereof, thereby insuring that the required normal forces between all of the members of the matrix are substantially equal at all times.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:

1. A multiple drill head having a matrix section having means for supporting a plurality of circular cylindrical bodies in parallel relationship, the bodies in a first group thereof being disposed in spaced relationship, means for driving at least one of the bodies in said first group, at least one second group of bodies disposed in spaced relationship, each of said bodies in the second group drivingly engaging successive pairs of bodies in the first group, and means constantly urging the bodies of the second group into engagement with the bodies of the first group, at least some of the bodies in the second group thereof being the shanks of drills.

2. A multiple drill head as claimed in claim 1, wherein the circular cylindrical bodies are maintained in a tight compact stable group, the members of which are frictionally drivingly connected for synchronous rotation by rolling contact between those bodies which engage each other, each member of the group of bodies being engaged only by other bodies which rotate in the same direction.

3. A multiple drill head as claimed in claim 2, wherein the bodies within the main central area of the matrix consist of first bodies consisting of drill shanks and dummies, and of second bodies consisting of idlers, certain of the idlers spaced over the area of the matrix being power driven the drill shanks and dummies having the same first diameter, the idlers having the same second diameter, the first diameter being somewhat larger than the second diameter, each of the first bodies being engaged by a plurality of second bodies spaced at equal angles thereabout.

4. A multiple drill head as claimed in claim 3, wherein each of the first bodies is engaged by four second bodies spaced 90° about the first bodies.

5. A multiple drill head as claimed in claim 4, wherein the bodies in the main central area of the matrix consist of two straight rows of bodies, said rows being disposed at 90° with respect to each other, each row consisting of first and second bodies alternating with each other.

6. A multiple drill head as claimed in claim 1, wherein the bodies in their driving portions are smooth and frictionally drivingly engage each other.

7. A multiple drill head as claimed in claim 6, wherein at least some of the successive bodies in the drive train from the driven body in the first group are the shanks of drills of opposite hand.

8. A multiple drill head as claimed in claim 1, comprising a dummy storage section in the drill head disposed in alignment with the matrix section, said dummy storage section having a plurality of elongated parallel compartments therein each aligned with a respective body in a second group thereof, the compartments of the storage section being adapted to receive from the matrix section the respective dummy bodies in the second group when such dummy bodies are replaced in the matrix section by the shanks of drills, and means selectively to retain the dummies in said dummy storage compartments.

9. A multiple drill head as claimed in claim 8, wherein the means selectively to retain the dummies in said dummy storage compartments comprises a plate removably disposed in the drill head, said plate lying between and transverse to the dummy storage and matrix sections and when in place functioning as a thrust abutment for the inner ends of the drill shanks.

10. A multiple drill head as claimed in claim 1, comprising a main driven drive shaft, a plurality of driven bodies distributed throughout the first group of bodies, and a gear train drivingly connecting the main shaft and said plurality of driven bodies.

11. A multiple drill head as claimed in claim 10, wherein said main shaft and gear train are disposed beyond that end of the dummy storage section which is remote from the matrix section, and the plurality of driven bodies are in the form of elongated shafts which extend from the gear train through the dummy storage section and into the matrix section.

12. A multiple drill head as claimed in claim 8, wherein the dummy storage section comprises a block having a plurality of parallel vertical slots extending from one side of the block toward the opposite side thereof, the slots generally centrally intersecting and including the respective dummy storage compartments and having a vertical height equal to that of such compartments, said slots being adapted to receive a selectively employed tool having a blade-like member insertable through the open sides of the slots for removing the dummies from their storage compartments and the drills aligned therewith from the matrix.

13. A multiple drill head as claimed in claim 1, wherein the matrix is rectangular in transverse section, and wherein the means constantly urging the bodies of the second group into engagement with the bodies of the first group comprises rows of fixed outer support rollers disposed along three sides of the matrix, a further row of outer support rollers disposed along the fourth side of the matrix, and means for constantly urging the further row of outer support rollers inwardly toward the center of the matrix.

14. A multiple drill head as claimed in claim 13, wherein the bodies within the main central area of the matrix consist of first bodies consisting of drill shanks and dummies, and of second bodies consisting of idlers, certain of the idlers spaced over the area of the matrix being power driven, the drill shanks and dummies having the same first diameter, the idlers having the same second diameter, the first diameter being somewhat larger than the second diameter, each of the first bodies being engaged by a plurality of second bodies spaced at equal angles thereabout, each of the first bodies is engaged by four second bodies spaced 90° about the first bodies, the bodies in the main central area of the matrix consist of two straight rows of bodies, said rows being disposed at 90° with respect to each other, each row consisting of first and second bodies alternating with each other, and comprising an intermediate support roller between and engaging each two successive support rollers, and intermediate support idlers angularly spaced about the outer support rollers and interposed between them and the bodies making up the main central area of the matrix.

15. A multiple drill head as claimed in claim 14, wherein the intermediate support rollers are disposed in alignment with and at the ends of said rows of bodies in the matrix.

References Cited
UNITED STATES PATENTS 513,088    1/1894   Crane _____________ 145—60.5

FOREIGN PATENTS 909,630    4/1954   Germany.

FRANCIS S. HUSAR, *Primary Examiner.*

U.S. Cl. X.R.

77—29; 144—110